(12) United States Patent
Birke et al.

(10) Patent No.: US 8,460,831 B2
(45) Date of Patent: Jun. 11, 2013

(54) PASTE-LIKE MASS WITH INORGANIC, LIQUID CONDUCTORS AND LAYERS AND ELECTROCHEMICAL ELEMENTS PRODUCED THEREFROM

(75) Inventors: Peter Birke, Itzehoe (DE); Gerold Neumann, Halstenbeck (DE)

(73) Assignee: Leclanche' SA, Yverdon-les-Bains (CH)

( * ) Notice: Subject to any disclaimer, the term of this patent is extended or adjusted under 35 U.S.C. 154(b) by 2581 days.

(21) Appl. No.: 11/068,054

(22) Filed: Nov. 8, 2004

(65) Prior Publication Data
US 2011/0266489 A1 Nov. 3, 2011

Related U.S. Application Data

(63) Continuation of application No. 09/830,131, filed on Jul. 23, 2001, now abandoned.

(30) Foreign Application Priority Data

Oct. 20, 1998 (DE) .................................. 198 48 255
Feb. 28, 1999 (DE) .................................. 199 08 532

(51) Int. Cl.
*H01M 10/056* (2010.01)
*H01M 6/14* (2006.01)

(52) U.S. Cl.
USPC ........... 429/303; 429/344; 429/346; 252/62.2

(58) Field of Classification Search
None
See application file for complete search history.

(56) References Cited

U.S. PATENT DOCUMENTS

| 3,891,457 | A | * | 6/1975 | Auborn | 429/104 |
| 4,277,147 | A |   | 7/1981 | Arnoldussen | |
| 4,629,666 | A | * | 12/1986 | Schlaikjer | 429/346 |
| 4,847,173 | A |   | 7/1989 | Mitsunaga et al. | |
| 4,891,281 | A | * | 1/1990 | Kuo et al. | 429/105 |

(Continued)

FOREIGN PATENT DOCUMENTS

| DE | 3929316 | 3/1991 |
| EP | 0343840 | 11/1989 |

(Continued)

OTHER PUBLICATIONS

G. Feuillade et al, Journal of Applied Electrochemistry 5 (1975) 63-69, *Ion-conductive macromolecular gels and membranes for solid lithium cells.*

*Primary Examiner* — Jonathan Crepeau
(74) *Attorney, Agent, or Firm* — 24IP Law Group (57) ABSTRACT

The present invention relates to paste-like masses that can be used in electrochemical elements, comprising a heterogeneous mixture of (A) a matrix containing or comprising at least one organic polymer, precursors thereof, or prepolymers thereof, (B) an electrochemically activatable inorganic or largely inorganic liquid that does not dissolve the matrix or essentially does not dissolve the matrix, and, if required, (C) a powdery solid that is essentially inert relative to the electrochemically activatable liquid. The invention furthermore relates to self-supporting layers or layers that are placed on a substrate, comprising a heterogeneous mixture of (A) a matrix containing or comprising at least one organic polymer as defined in any of claims 1 through 7, (B) an electrochemically activatable inorganic or largely inorganic liquid that does not dissolve the matrix or essentially does not dissolve matrix, and if required, (C) a powdery solid that is essentially inert relative to the electrochemically activatable liquid, and composite layers with electrochemical properties that contain such layers. The layers and composite layers can be used advantageously for producing batteries, low-temperature fuel cells, solar cells, or electrochemical sensors.

8 Claims, 3 Drawing Sheets

U.S. PATENT DOCUMENTS

| | | |
|---|---|---|
| 4,895,775 A | 1/1990 | Kato et al. |
| 5,009,970 A | 4/1991 | Krinfli et al. |
| 5,041,346 A | 8/1991 | Giles |
| 5,296,318 A | 3/1994 | Gozdz et al. |
| 5,338,625 A | 8/1994 | Bates et al. |
| 5,418,091 A | 5/1995 | Dozdz et al. |
| 5,429,891 A | 7/1995 | Gozdz et al. |
| 5,456,000 A | 10/1995 | Gozdz et al. |
| 5,460,904 A | 10/1995 | Gozdz et al. |
| 5,470,357 A | 11/1995 | Schmutz et al. |
| 5,478,668 A | 12/1995 | Gozdz et al. |
| 5,540,741 A | 7/1996 | Gozdz et al. |
| 5,546,000 A | 8/1996 | Maas et al. |
| 5,571,634 A | 11/1996 | Gozdz et al. |
| 5,587,253 A | 12/1996 | Gozdz et al. |
| 5,607,485 A | 3/1997 | Gozdz et al. |
| 5,648,011 A | 7/1997 | Blonsky |
| 5,707,759 A | 1/1998 | Simon et al. |
| 5,728,489 A | 3/1998 | Gao et al. |
| 6,001,509 A | 12/1999 | Kim et al. |

FOREIGN PATENT DOCUMENTS

| | | |
|---|---|---|
| EP | 0379372 | 7/1990 |
| EP | 0528557 | 2/1993 |
| EP | 0557250 | 8/1993 |
| EP | 0762525 | 3/1997 |
| EP | 0820077 | 1/1998 |
| JP | 61181061 | 8/1986 |
| JP | 6150973 | 5/1994 |
| JP | 10270023 | 10/1998 |
| JP | 11031414 | 2/1999 |
| WO | WO95/16285 | 6/1995 |
| WO | WO96/68868 | 12/1996 |
| WO | WO97/06573 | 2/1997 |
| WO | WO97/49106 | 12/1997 |
| WO | WO98/18173 | 4/1998 |
| WO | WO98/26468 | 6/1998 |
| WO | WO99/44245 | 9/1999 |

* cited by examiner

PASTE-LIKE MASS WITH INORGANIC, LIQUID CONDUCTORS AND LAYERS AND ELECTROCHEMICAL ELEMENTS PRODUCED THEREFROM

This application is a continuation of Ser. No. 09/830,131, filed Jul. 23, 2001 now abandoned.

BACKGROUND OF THE INVENTION

The present invention relates to novel materials with electrochemical properties, in particular paste-like masses, layers produced from these masses that are self-supporting or that are placed on a substrate and that can be flexible, and composite layers produced therefrom that can be used as primary batteries, accumulators, low-temperature fuel cells, solar cells, or the like.

Since the beginning of the 1970's there have been attempts to produce electrochemical elements such as accumulators or the like in the form of thin layers. The goal has been to obtain composite films that have particularly good charging and discharging properties due to an extremely high contact area between the individual electrochemical components, such as electrodes and electrolytes, relative to the volume of active electrochemical material used. In special circumstances such composite films are also required to have high flexibility so that they can be rolled up or made to conform to another desired shape.

In the past, attempts to produce such electrode materials have begun with solid or viscous liquid Teflon, which is mixed with a certain percentage of carbon and the actual electrode material and is then pressed or sprayed onto suitable contact electrodes. However, this results in layers that have insufficient flexibility. In addition, it has been suggested that electrode layers be produced that are manufactured with PVC and tetrahydrofurane or another polymer dissolved in a solvent and that the solvent subsequently be extracted therefrom. However, the conductivity of products produced in this manner is not favorable.

Producing a layer that can function in an appropriate electrochemical composite as an electrolyte presents particular problems. U.S. Pat. No. 5,456,000 describes rechargeable battery cells that are produced by laminating electrode and electrolyte cells. Used for the positive electrode is a film or membrane that is produced separately from $LiMn_2O_4$ powder in a matrix made of a polymer/copolymer and is then dried. The negative electrode comprises a dried coating of a pulverized carbon dispersion in a matrix of a polymer/copolymer. An electrolyte/separator membrane is arranged between the electrode layers. For this purpose a poly(vinylidene fluoride)-hexafluoropropylene copolymer is converted with an organic plasticizer such as propylene carbonate or ethylene carbonate. A film is produced from these components and then the plasticizer is extracted from the layer. The battery cell is maintained in this "inactive" condition until it is to be used. In order to activate it, it is immersed in a suitable electrolyte solution, whereby the cavities formed by extracting the plasticizer are filled with the liquid electrolytes. The battery is then ready for use.

Such a construct is disadvantageous in that the battery must be activated shortly prior to the point in time at which it is to be used. This is not acceptable in most cases.

The object of the present invention is to provide paste-like masses that already contain the appropriate conductor (ion or mixed conductor, especially the electrolytes or at least one of the electrodes) in liquid form and that are suitable for producing electrochemically activatable layers with such a liquid conductor in corresponding electrochemical elements that can be employed immediately. These elements should be suitable for a broad spectrum of products such as primary batteries, rechargeable batteries (accumulators), low-temperature fuel cells, solar cells, electrochemical sensors, or the like, that can have a layer form, in particular the form of a film laminate, that have very good conductive properties and, if required, high flexibility, and that furthermore cannot leak out and that therefore do not necessarily have to be arranged in housings, in particular in sealing housings.

BRIEF SUMMARY OF THE INVENTION

This object is achieved in that in accordance with the present invention, paste-like masses that can be used in electronic elements are prepared that include or comprise a mixture of (A) a matrix containing or comprising at least one organic polymer, precursors thereof, or prepolymers thereof, (B) an electrochemically activatable inorganic liquid that does not dissolve the matrix or that essentially does not dissolve the matrix, and, if required, (C) a powdery solid that is inert relative to the electrochemically activatable liquid. These paste-like masses can be processed into appropriate self-supporting layers or layers that can be placed upon something (for example, films, so-called tapes) that can be combined to make electrochemical elements or that can be combined with other components to provide such elements. Alternatively, in some cases the masses are formed from components (A) and, if required, (C), then consolidated into layers, and at that point finally provided with the component (B).

DETAILED DESCRIPTION OF THE INVENTION AND FIGURES

The term "that can be used in electrochemical elements" implies that the electrochemically activatable inorganic liquid can be an ion-conducting or electron-conducting liquid that is suitable for a liquid electrode material or liquid electrolyte. Electronically conducting liquids that can also change their stoichiometry (which is associated with a change in valence and a charge transport) are also included. Such liquids can replace solid intercalation electrodes.

The mass obtains its paste-like consistency from the use of a suitable matrix (A) preferably in conjunction with the powdery solid (C) that acts as filler and support material. The term "paste-like" means that the mass, once it has been produced, can be processed using current paste application methods, for example, it can be applied to a base using a brush, spatula, rake, or various pressure methods, or it can be processed into a film. Depending on the need, the mass can be made to be relatively thin to very viscous.

A plurality of materials can be used for the matrix (A). Systems containing solvents or solvent-free systems can be used. Solvent-free systems that are suitable are, for example, cross-linkable liquid (if necessary) or, above all, paste-like resin systems. Examples are resins made of cross-linkable addition polymers or condensation resins. For instance, precondensates of phenoplasts (novolaks) or aminoplasts can be used that are final-polymerized to the layer of an electrochemical composite layer after the paste-like mass has been formed. Additional examples are unsaturated polyesters, such as polyesters that can be cross-linked to styrene by graft copolymerization, polycarbonates that can be cross-linked by bifunctional epoxy resins that are bifunctional reaction partner curable (for example bisphenol-A-epoxy resin, cold cured with polyamide), polyisocyanurate that can be cross-linked by a polyol, and binary polymethyl methacrylate, which can also be polymerized with styrene. The paste-like mass is formed from the more or less viscous precondensate or non-cross-linked polymer for matrix (A) or using essential components thereof, together with the component (B).

Another option is to use polymers or polymer precursors together with a solvent or swelling agent for the organic polymer. In principle there is no limit in terms of the synthetic or natural polymers that can be used. Not only can polymers with carbon main chains be used, but also polymers with heteroions in the main chain, such as polyamides, polyesters, proteins, or polysaccharides. The polymers can be homopolymers or copolymers. The copolymers can be statistical copolymers, graft copolymers, block copolymers, or polyblends; there is no limitation. In terms of polymers with a pure carbon main chain, natural or synthetic rubbers can be used, for instance. Particularly preferred are fluorinated hydrocarbon polymers such as Teflon, poly(vinylidene fluoride) (PVDF) or polyvinyl chloride, since these make it possible to obtain particularly good water-repellant properties in the films or layers formed from the paste-like mass. This imparts particularly good long-term stability to the electrochemical elements thus produced. Additional examples are polystyrene or polyurethane. Examples of copolymers are copolymers of Teflon, amorphous fluoropolymers, and poly(vinylidene fluoride)/hexafluoropropylene (commercially available as Kynarflex). Examples of polymers with heteroatoms in the main chain are polyamides of the diamine dicarboxylic acid type or of the amino acid type, polycarbonates, polyacetals, polyethers, and acrylics. Additional materials include natural and synthetic polysaccharides (homeoglycans and heteroglycans), proteoglycans, for example, starch, cellulose, methylcellulose. In addition, substances such as chondroitin sulfate, hyaluronic acid, chitin, natural or synthetic wax, and many other substances can be used. In addition, the aforesaid resins (precondensates) can be used in solvents and diluents.

One skilled in the art is familiar with solvents and swelling agents for the aforesaid polymers.

A plasticizer (also softener) can be present for the polymer or polymers used regardless of whether or not the matrix (A) contains a solvent or swelling agent. "Plasticizer" or "softener" should be understood to include substances whose molecules are bonded to the plastic molecules by coordinate bonds or secondary valences (Van der Waals forces). They thus diminish the interacting forces between the macromolecules and therefore lower the softening temperature and the brittleness and hardness of the plastics. This is different from swelling agents and solvents. Due to their higher volatility, it is generally also not possible to remove them by evaporating them out of the plastic. Rather, they must be extracted using an appropriate solvent. Using a plasticizer effects high mechanical flexibility in the layer that can be produced from the paste-like mass.

One skilled in the art is familiar with suitable softeners for each of the plastics groups. They must be highly compatible with the plastic into which they are to be worked. Common softeners are high-boiling esters of phthalic acid or phosphoric acid, such as dibutyl phthalate or dioctylphthalate. Also suitable are, for instance, ethylene carbonate, propylene carbonate, dimethoxyethane, dimethylcarbonate, diethyl carbonate, butyrolactone, ethylmethylsulfon, polyethylene glycol, tetraglyme, 1,3-dioxolane, or S,S-dialkyldithiocarbonate.

One reason for adding the solid (C) is to improve the properties of the matrix (A), for instance with regard to its support or behavior when the tape is drawn. The solid (C) should be used in a form that can be finely distributed (for example a powder). All substances are suitable that are not affected by the liquid (B), in particular that are also not oxidatively/reductively changed. Since they are frequently very aggressive chemically, substances like $SiO_2$, $Si_3N_4$, $Al_2O_3$, AlN, MgO, or mixtures thereof, and the like are primarily used. However, any other substance can be used that is inert to the electrolyte or electrode material being used.

The liquid used as electrode, electrolyte, or the like, should be at least substantially inorganic in nature. For instance, vanadium oxychloride or vanadium bromide can be used in which the oxidation stage of the vanadium can increase via VOX, $VOX_2$, $VO_2X$ from +III to +V. Decomposition electrodes can be obtained with such, materials; compared to intercalation electrodes, they have the advantage that they do not have the expansion in volume that is typical for intercalation electrodes. This makes it possible to achieve improved service life over time.

In principle any liquid electrolyte suitable for the system can be used for electrolyte material; a plurality of such systems and corresponding electrolytes are known. For instance, aqueous systems like sulfuric acid or KOH can be used for proton-conducting electrolytes in systems such as lead accumulators or Ni—Pb accumulators or nickel-cadmium or nickel metal hydride accumulators, whereby advantageous packing densities can be obtained.

In order to facilitate the transport of the conducting liquid in the possibly water-repellant matrix, if necessary an alcohol or another polar organic solvent that is miscible with water can be added to the electrolyte. Especially suitable for this are straight- or branched-chain mono-, di-, or trialcohols with preferably 1-6 carbon atoms, such as methanol, ethanol, propanol, glycol, glycerin, or the like. Particularly when a polymer matrix is used with a plasticizer that is extracted from the polymer matrix, such an aqueous mixture easily moistens the (cross-linked, if necessary) matrix in the finished layer so that the transport is made easier. However, it should be clear that the phrase "largely inorganic liquid" excludes the possibility that the electrolyte comprises or largely comprises a salt and a purely organic solvent like ethyl carbonate, diethoxyethane, or the like. Any content of organic solvent present should therefore make up no more than 70 vol. %, preferably 50 vol. %, of the total quantity of solvent. Depending on the property of the matrix and/or the organic solvent, a maximum of, for instance, 30 or 15 vol. % thereof is also sufficient.

In one alternative, the matrix material can contain a softener or plasticizer that is miscible with water. This increases the hydrophilic nature of the matrix material with the same result. The statements made in the foregoing apply to the maximum quantity of the organic additive. In another variant, a hygroscopic salt, for instance, $MgCl_2$, can be added to the matrix material. It draws water into the matrix with the same result that the transport of the electrolyte through the matrix is made easier.

For the electrolytes, in addition to aqueous systems, anhydrous, liquid inorganic electrolytes can also be used, such as $H_2SO_4$ or $LiAlCl_4/SO_2$ (the latter system occurs when the gaseous sulfur dioxide reacts with lithium aluminum chloride). Such systems also have a relatively high surface tension compared to more highly hydrophobic polymer matrices. There are a plurality of measures for facilitating their migration through the polymer matrix, as well, above all the two variants first cited for aqueous electrolytes, that is, adding alcohol or the like to the electrolyte and/or adding a plasticizer to the polymer matrix.

As stated in the foregoing, these inventive paste-like masses and layers produced therefrom are suitable for a plurality of electrochemical elements that are preferably embodied as composite film/layer. One skilled in the art can select the same liquids (B) that he would use for classic electrochemical elements, that is, substances to which no plastics have been added.

The following components of an accumulator are examples of options that can be used for lithium-technology accumulators:

| | |
|---|---|
| lower contact electrode | Al, Cu, Pt, Au, C |
| positive electrode | LiF, $Li_xNiVO_4$, $Li_x[Mn]_2O_4$, $LiCoO_2$, $LiNiO_2$, $LiNi_{0.5}Co_{0.5}O_2$, $LiNi_{0.8}Co_{0.2}O_2$, $V_2O_5$, $Li_xV_6O_{13}$ |
| electrolyte | $LiAlCl_4/SO_2$ (anhydrous) |
| negative electrode | Li, $Li_{4+x}Ti_5O_{12}$, $Li_xMoO_2$, $Li_xWO_2$, $Li_xC_{12}$, $Li_xC_6$, lithium alloys |
| upper contact electrode | Al, Cu, Mo, W, Ti, V, Cr, Ni |

While the electrolyte layer of this accumulator can be formed from a paste-like mass in accordance with the present invention, the other layers, if necessary, can also be produced using paste-like masses into which a powdery electrode material is worked instead of a liquid (B). The electrode material is preferably not soluble in the polymer matrix. Particularly preferred is a ratio of electrode material to polymer matrix approaching 70 to 30% weight. The polymer matrix can have the same components as the masses in accordance with the invention described above.

However, of course, the present invention is not limited to lithium-technology accumulators. As mentioned in the foregoing, there is a plurality of possible applications. For instance, the masses in accordance with the invention can be processed into self-supporting films or layers placed on a substrate that can be used in primary or secondary batteries, decomposition batteries, low-temperature fuel cells, solar cells, or electrochemical sensors.

The components described in the foregoing from which the inventive paste-like mass is produced can be mixed in a conventional manner, preferably by vigorously agitating or kneading the components. If necessary the organic polymer or its precursors are pre-dissolved or pre-swollen in the solvent or swelling agent before the components (B), and (C), if any, are added. The component (C), if provided, is preferably processed with the component (A) into said paste-like mass prior to consolidation of the mass. The component (B) can also be added at this stage. Alternatives hereto are described below.

The inventive paste-like masses are especially suitable for producing thin-film batteries and other similar electrochemical elements such as electrochemical sensors. Preferably these are elements in so-called "thick-film" technology. The individual layers of these elements are also called "tapes". Individual electrochemically active or activatable layers are produced in thicknesses from approximately 10 μm to approximately 1 to 2 mm, placed upon one another, and brought into intimate contact. One skilled in the art will select the thickness appropriate for the application. Ranges are preferably from approximately 50 μm to 500 μm; especially preferred is a range of approximately 100 μm. However, in accordance with the invention, it is also possible to produce corresponding thin-film elements (this term includes thicknesses of preferably 100 nm to a few μm). However, this application may be limited because corresponding elements will not satisfy current requirements in terms of capacity in a number of cases. However, it is conceivable that the application could be used for back-up chips, for instance.

In addition, the paste-like masses in accordance with the invention can also be made into other forms. Thus, thicker layers (for instance, in the range of approximately 1 to 10 mm) can be produced, from which shapes can be punched or cut. The latter are suitable, for instance, for batteries and accumulators in medical technology, which must be very small and very safe. One example of an application is batteries for hearing aids. These are either worn flush against or in the ear or are even implanted so that in addition to taking up a minimal amount of space, there are particularly stringent requirements against leakage. Naturally the cited forms can also be produced directly, for instance using casting, injection molding, or extrusion processes.

The present invention therefore furthermore includes layers that can be produced from the paste-like masses described in the foregoing that are self-supporting or that are placed on a substrate, preferably in the thicknesses indicated. The layers are preferably flexible.

For producing both the self-supporting layers (films, tapes) and layers that can be placed on a substrate, methods known in the prior art can be used that are useable for the appropriate polymer materials of the matrix. The consolidation of the paste-like masses then occurs, depending on the material, by curing (of resins or other precondensates), by cross-linking prepolymerisates or linear polymerisates, by evaporating solvents (such as acetone or the like), or in a similar manner. If the polymer matrix contains a plasticizer, it is particularly advantageous that the paste-like mass can be kept sufficiently viscous while the solvent is extracted so that homogeneous distribution of the components is maintained. If the invention is provided in an embodiment in which the plasticizer is not meant to satisfy any additional objectives (for instance, increasing the hydrophilic nature of the matrix material), it can also be removed once the paste-like mass has consolidated to a self-supporting layer or a layer that can be applied to something provided the polymer matrix does not have a strong tendency toward crystallization and thus resultant brittleness and lack of flexibility. An example of a sufficiently flexible polymer is the combination of poly(vinylidene fluoride) with hexafluoropropylene for polymer/copolymer.

In a special embodiment of the invention, the component (B) is not yet added or is only partially added during the production of the paste-like mass. That is, as described in the foregoing, if the plasticizer is removed from the self-supporting layer or layer that is placed upon something that results after the mass has consolidated (for instance, by extraction after a solvent such as hexane is added), cavities form in the consolidated matrix, similar to a sponge. Submersion in a liquid (B), together with capillary forces, can then cause the liquid to be drawn into the resulting hollow spaces and remain stable therein.

In order to obtain films that are self-supporting, a suitable paste-like mass can be formed in the appropriate thickness on calenders, for example. Standard technology can be used for this. Self-supporting layers can also be formed by applying the paste-like mass to a substrate and removing the layer produced after it has consolidated. The requirement for this is that the product has sufficient flexibility. The coating process can be performed using conventional paste application methods. For instance, application can be performed by brush, rake, spraying, spin coating, etc. Pressure techniques can also be used. As described in the foregoing, the liquid (B) can either already be worked into the paste-like mass, or it can fill the cavities resulting after a paste-like mass comprising at least the polymer matrix (A) and the filler (C) has consolidated and the softener contained therein has been removed.

In a preferred embodiment of the invention, cross-linkable resin masses (pre-condensates) are used as described above for the paste-like masses, and are cured by UV or electron radiation once the layer has been formed. Curing can naturally also be thermal or chemical (for example, by immersing the produced layer in an appropriate bath). If necessary, suitable initiators or accelerators or the like are added to the masses for the cross-linking.

The present invention furthermore relates to composite layers with electrochemical properties, especially accumulators and other batteries or sensors that are formed by or include a corresponding sequence of the aforesaid layers.

Figure 1:
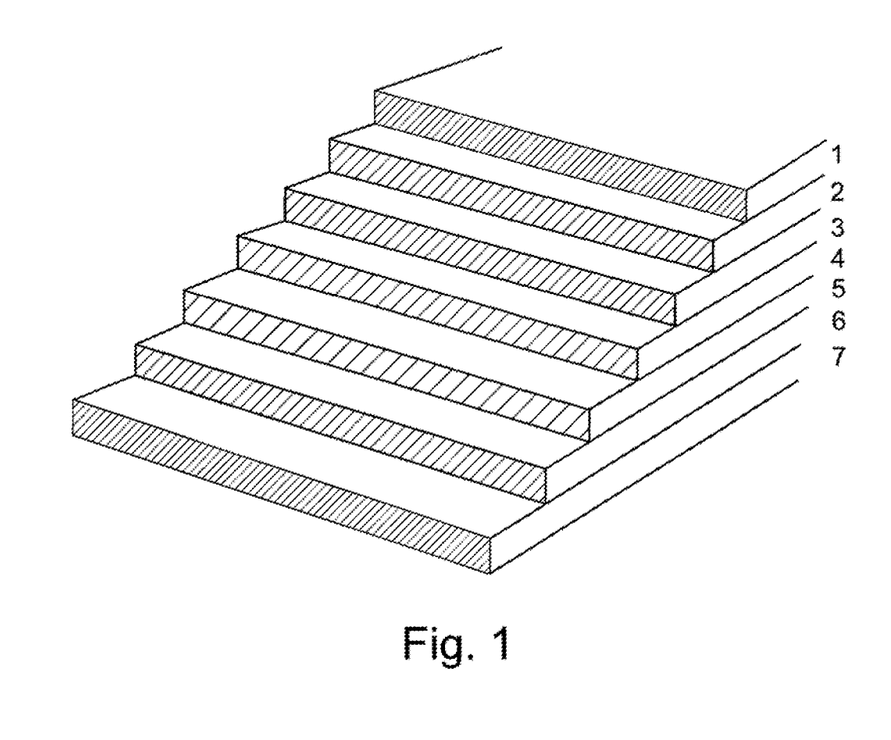
FIG. 1 shows a possible sequence of composite layers within an electrochemical cell of a preferred embodiment.

FIG. 1 illustrates one possible sequence of such an arrangement. The labels are: contact electrode 1, intermediate tape 2, electrode 3, electrolyte 4, electrode 5, intermediate tape 6, and contact electrode 7. The following text provides a more detailed explanation.

For producing composite layers, the individual paste-like masses can be applied ply by ply upon one another by means of paste application methods. Either each individual ply can be cross-linked by itself or it can be released by solvent or made into layer form in some other manner. However, it is also possible to consolidate the individual matrices by cross-linking or evaporating the solvent or swelling agent or the like once all of the required layers have been applied. This latter is advantageous, for instance, if the individual electrochemically activatable layers are applied using a pressure method that occurs analogous to polychromy. An example of this is the Flexodruck technique, by means of which multiple meters/second of a substrate can be printed continuously with the required electrochemically activatable layers.

Alternatively, every layer or film can be converted individually into its final consolidated state. If these are self-supporting films, the appropriate components of the element to be formed can then be joined together by lamination. Conventional laminating techniques can be used for this. These include, for example, extrusion coating, whereby the second layer is bonded to a carrier layer by pressure rollers, calender coating with two or three roll nips, wherein the substrate web runs in addition to the paste-like mass, or doubling (bonding under pressure and counterpressure of preferably heated rollers). One skilled in the art will not have any problem finding the techniques that are appropriate depending on the selection of the matrices for the paste-like masses.

A pressure process during the bonding (lamination) of the individual layers can frequently be desirable, for instance for improved bonding (and therefore for achieving improved conductivity) in the individual layers. Current techniques can be used for this. Cold pressing (at temperatures below 60° C.) can be advantageous if the materials used permit this. This provides particularly good contact among the individual layers.

In all applications, the advantage of using the inventive paste-like mass or the self-supporting foil produced therefrom or layers produced therefrom that are placed on a substrate is the cost effectiveness, the high practical energy density due to the compact structure, the high reliability against leakage, since the liquid electrolyte or the liquid electrode is bound in the polymer matrix as in a sponge.

The electrochemical parts that can be produced with the inventive paste-like masses are not limited. It is therefore understood that the embodiments described in the following are merely examples and preferred embodiments.

Re-chargeable electrochemical cells can be produced in thick-layer technology in this manner, i.e., with individual electrochemically activatable layers in a thickness of approximately 10 µm to approximately 1 to 2 mm and preferably approximately 100 µm. If the electrochemical cell is to be based on lithium technology, the liquids for the electrolyte layers or solid substances for the electrode layers can be those substances that have already been enumerated in the foregoing for this purpose. At least three layers should be provided, namely, one that functions as a positive electrode, one that functions as a solid body electrolyte, and one that functions as the negative electrode, i.e., layers 3, 4, and 5 in FIG. 1.

In accordance with the present invention, it has been demonstrated that particularly advantageous current densities can be obtained in the accumulator if certain limits are observed. As is known, current density can be adjusted by the resistance of the electrolyte. If it is too high, polarization can destroy the electrodes over the long term. If it is too low, the power of the produced accumulator is only sufficient for a few applications. The aforesaid limit is preferably 1 mA/cm$^2$. If the electrolyte layer is approximately 100 µm, a current density of 1 mA/cm$^2$ then causes a drop in voltage, caused by the resistance, that is a negligible 0.1 V. If, for instance, an electrolyte has a conductivity of $10^1$ S/cm, the micro-geometry in the layer (filler and channels) causes the conductivity relative to the layer to be approximately $10^0$ S/cm. A highly recommended criterion is that the layer thickness d be selected relative to conductivity $\sigma_{ion}$ and an ionic resistance ($\Omega$) and relative to the surface A such that the following formula is satisfied:

$$200 \: \Omega < d/(\sigma_{ion} \cdot A)$$

This criterion can be observed in an excellent manner when the tapes in accordance with the invention are used.

The aforesaid three-layer cell (or any other desired electrochemical element, comprising positive electrode/electrolyte/negative electrode) can additionally be provided with contact electrodes (layers 1 and 7 in FIG. 1). It is useful that these comprise films of suitable materials (materials for contact electrodes that can be used in lithium technology are described earlier in this specification).

Figure 3:
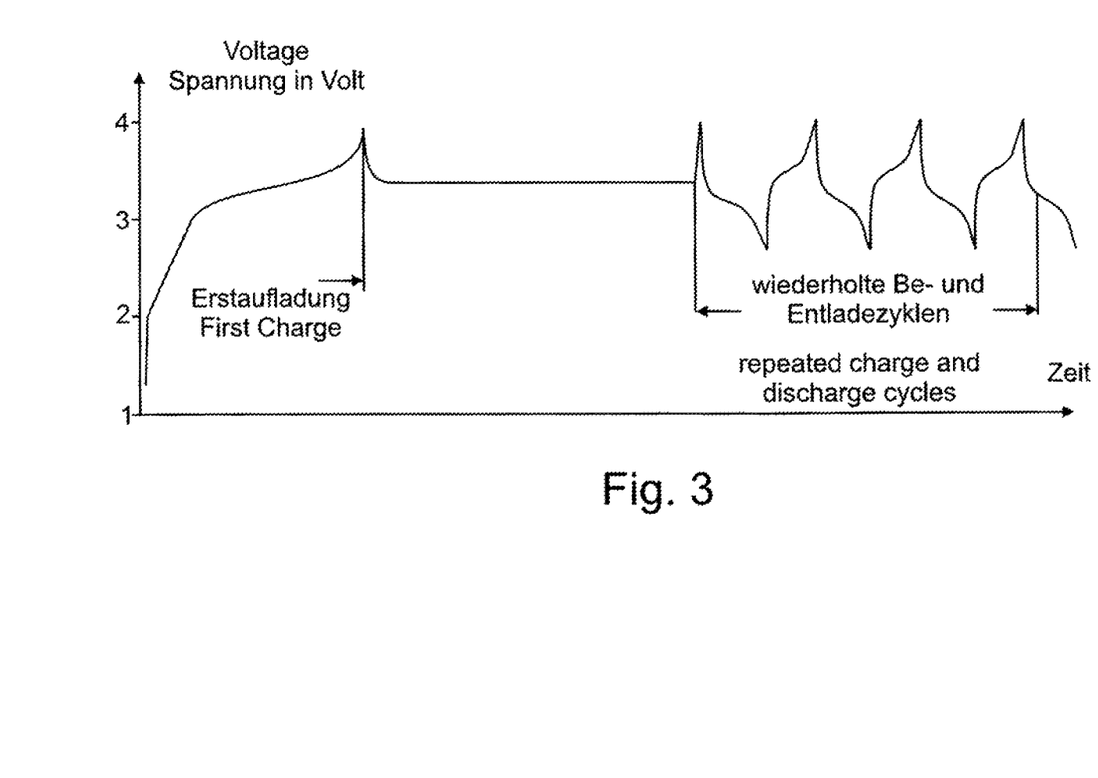
FIG. 3 shows a charge ad discharge curve of a cell with contact electrodes and intermediate tapes as shown in FIG. 1.

In a special embodiment of the invention, worked in between the lower contact electrode and the adjacent electrode and/or between the upper contact electrode and the adjacent electrode is an additional thin plastic layer ("intermediate tape", layers 2 and 6 in FIG. 1) that can also be produced using a paste-like mass. This thin plastic layer should contain conducting metal elements or alloys of such elements that are suitable for transporting electrons from the electrode material to the contact electrode. Examples of this are the elements gold, platinum, rhodium, and carbon, or alloys of these elements, if the plastic layer is to be arranged between the positive electrode and the associated contact electrode. If it is to be arranged between the negative electrode and the contact electrode, the elements that are appropriate are nickel, iron, chromium, titanium, molybdenum, tungsten, vanadium, manganese, niobium, tantalum, cobalt, and carbon. The information provided in the foregoing about the electrodes and electrolytes also applies, of course, to the concentration and structure of the paste-like masses from which these layers are formed. An embodiment with contact electrodes and intermediate tapes (see also FIG. 1) has charge and discharge curves as illustrated in FIG. 3 if it is produced using the aforesaid lithium technology with LiAlCl$_4$/SO$_2$ for the electrolyte.

In another special embodiment of the invention, an electrochemical cell is prepared from at least three layers, whereby both electrodes are embodied as layers in accordance with the invention and the positive side (electrode) is a protic system while the negative side (counter-electrode) is an aprotic system. "Protic" is understood to be a system in which a salt, for instance a lithium salt like lithium nitrate or lithium perchlorate, is dissolved in a "protic", that is, proton-separating system (H$_2$O). Correspondingly, a solid electrolyte is selected for the intermediate layer, and its cation (for instance, lithium) is a conducting ion. In particular due to the water-repellant properties of the polymer matrix, in this special embodiment water is prevented from traveling to the negative side and being decomposed there. Advantages are the increased kinetics in the positive electrode due to the liquid electrolytes and the broad selection of possible electrolytes (in this case the problem of potential corrosion of the positive metal contact electrode is circumvented, for which aluminum is a favored choice due to its cost; for instance, electrolytes containing lithium perchlorate easily oxidize the contact electrode on the positive side).

The masses in accordance with the invention are suitable, for instance, for use in primary batteries, whereby they are suitable above all for producing the electrolyte layers. Suitable electrode systems are, for instance, zinc-coal, alkali-manganese (Zn—MnO$_2$), zinc-mercury oxide (Zn—HgO), zinc silver oxide (Zn—Ag$_2$O), zinc-atmospheric oxygen (Zn—O$_2$), magnesium-atmospheric oxygen (Mg—O$_2$), aluminum-atmospheric oxygen (Al—O$_2$). Suitable electrolytes are alcoholic solutions of alkali and ammonium bromides and chlorides or alkali hydroxides (especially of the alkali metals sodium and potassium).

The masses in accordance with the invention are furthermore suitable for use in secondary batteries. Some such systems, such as the lead accumulator and the nickel metal hydride cell, were already mentioned in the foregoing. Other such systems include nickel-cadmium, nickel-iron, zinc-silver oxide, and alkali-manganese secondary cells. Suitable electrolytes for these are, for instance, aqueous or anhydrous H$_2$SO$_4$ (for example, for the lead accumulator) or potassium hydroxide.

The masses in accordance with the invention can also be used for a new type of battery, the so-called decomposition battery. A salt is decomposed in the positive electrode, for instance, MgBr$_2$, and the resulting bromine is stored in a carbon film (carbon tape). In this case, the electrolyte of the paste-like mass, or the film or layer produced therefrom, is MgCl$_2$, which is not decomposed since its decomposition voltage is higher than that of MgBr$_2$. Mg is precipitated out in situ as a negative electrode in a metal film or carbon film that functions as a sponge. Alternatively, the magnesium can be precipitated out at the surface of the aforesaid materials if they are present in the closed form; the first variant is preferred, however, due to the more favorable volumes. The cell voltage is equal to the decomposition voltage of MgBr$_2$. Particularly advantageous in such accumulators is that in this case higher valence ions can be used since the capacity increases with the valence. In particular the light and low-cost elements Mg and Al are accessible. In these systems, inorganic, aqueous, or at least liquid electrolytes should be used since the mobility of higher valence ions at room temperature in solid electrolytes is too low for battery and accumulator applications. The electrodes can be present either as metal or carbon film or even as powdery electrode material that is embedded in a film-type polymer matrix, as already described in the foregoing.

Another field of use for the paste-like masses in accordance with the invention is low-temperature fuel cells. In this case, proton-conducting polymer electrolytes (PEM: proton exchange membrane) like nafion were used in the past. However, this polymer electrolyte is expensive and sensitive to drying out. In particular, there is also no simple way to recharge the fuel cell; as a rule, the hydrogen storage unit, which is a small and expensive steel bottle, must be completely exchanged. In the past, the space required for such a hydrogen storage unit made it impossible to design such cells as thin-layer structures. In accordance with the invention, it is now provided that an electrolyte layer is employed using a polymer matrix into which a hygroscopic salt is worked, and this layer is maintained in an environment that retains moisture. When the salt is dissolved, this layer contains a liquid electrolyte (the aforesaid salt in the absorbed water), and the water can be electrochemically decomposed. The resultant hydrogen is then stored in another laminated hydride storage unit (Y, Pt, Pd, or another hydrogen-absorbing material in film form, preferably in an organic polymer matrix). The water lost by decomposition is continuously compensated by moisture being drawn in by the hygroscopic salt.

Also in this embodiment of the invention, an electrolyte layer can be used that is produced by mixing polymer, solvent, and softener for the polymer matrix (A) and solid substance (C) into a paste-like mass, converting this mass into the desired "tape" form, consolidating the form, and, if necessary, removing the solvent, extracting the softener, and "filling" the resultant cavities with the alcoholic solution of the hygroscopic salt, whereupon the alcohol is evaporated. Alternatively, the salt, dissolved together with alcohol as a dissolving intermediary, for instance, in the solvent or plasticizer can be worked into the paste-like mass. In this case the alcohol is preferably extracted together with the solvent. The filler (C) is preferably provided in this case in order to improve the mechanical stability of the resulting, membrane-like tape. It can be omitted, if necessary.

The inventive paste-like masses and the films or layers produced therefrom can also be used for solar cells. The system upon which these solar cells is based preferably uses the so-called Honda-Fujishima Effect (1972), rather than silicon technology. When radiated with sunlight, oxides such as titanium dioxide or tungsten trioxide are able to decompose (electrolyze) water and even other substances such as formic acid. This is because electrons are excited in the conduction band and the remaining gaps have a highly oxidizing effect, since oxides are already present in the highest state of oxidation known in chemistry. The solar cells include three layers (tapes): one stores hydrogen, which can be constructed as described for the low-temperature fuel cells; one is an electrolyte layer that contains water that is decomposed in operation and that can thus also be embodied as described for the fuel cells; and one is a tape additionally containing TiO$_2$ or WO$_3$ and preferably a metal powder or carbon (for ensuring sufficient electronic conductivity), which is otherwise constructed in the same manner as the electrolyte tape. In contrast to the fuel cell, the solar cell is "charged" with light. It works like a fuel cell while discharging.

The inventive paste-like masses and films or layers produced therefrom are furthermore also suitable for electrochemical sensors. For this application, a hygroscopic salt that attracts water is added to a polymer matrix. The water content in a film produced from the mass can be finely controlled using the salt concentration, ambient humidity, and temperature. Relative to a reference electrode that is embodied as laminated thereagainst, tape, different voltages occur as a function of the moisture content and thus permit the humidity to be measured.

The electrochemical elements of the present invention can be sealed, for instance, in a plastic-based housing. This results in an advantageous reduction in weight compared to metal housings; other advantages result in terms of energy density, as well.

The electrochemical composite layer (the electrochemical element) can also be embedded between two or more films on a plastic coated with wax or paraffin. These materials act as a seal and can also exert mechanical pressure on the composite layer due to their inherent properties, which advantageously results in improved contact in the composite layer due to pressure.

If the electrochemical element is sealed as in the foregoing or in some other manner, the interior can be subjected to a pre-specified hydrogen/oxygen partial pressure that effects high electrochemical stability. This can be done, for instance, by sealing the electrochemical element in such an environment with parameters appropriately set and selected.

Figure 2:
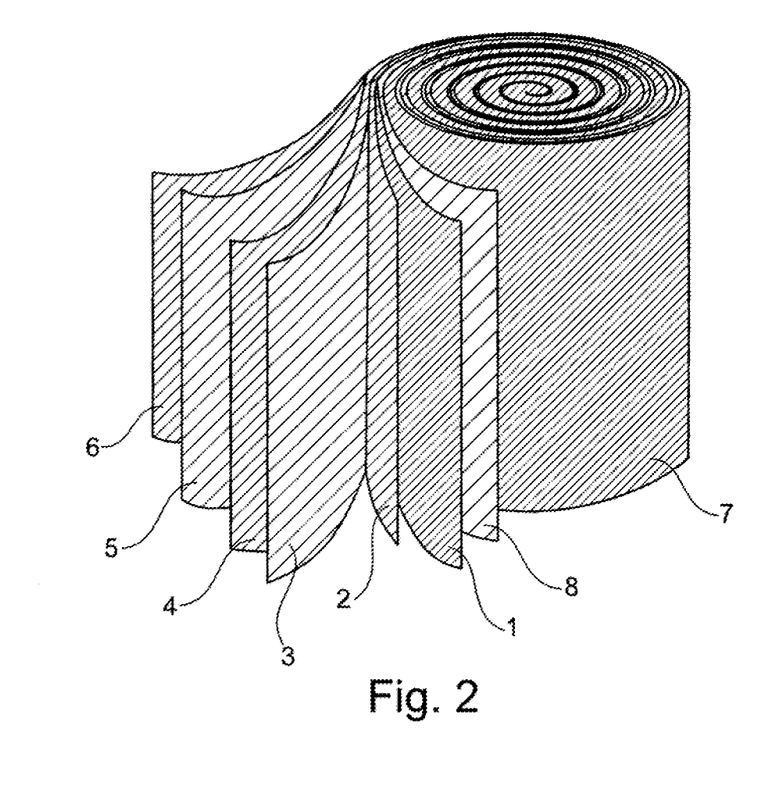
FIG. 2 shows an acculmulator with rolled layers of a preferred embodiment.

The inventive series of layers for the electrochemical elements can be arranged in any desired shape. For instance, the flexible composite layer can be rolled up, which achieves particularly advantageous geometry for compact accumulators. If the accumulator has a small volume, this provides a very large active battery surface. FIG. 2 illustrates such an embodiment, whereby reference numbers 1 through 7 indicate the same items as in FIG. 1 and reference number 8 indicates an insulating layer.

Non-self-supporting composite layers can also be applied to solid bases like walls for integrated energy storage (self-supporting composite films can, of course, also be applied or affixed thereto). In this case it is possible to take advantage of large surface areas. The accumulators themselves are not associated with a space requirement. A special example of an embodiment of this type is the integration of composite layers for accumulators in substrates for solar cells. Independent energy supply units can be created in this manner. Layer sequences for accumulators can also be applied to solid or flexible substrates in order to work in electronic structures of the integrated energy storage unit.

EXAMPLES

The invention is explained in greater detail in the following using examples.

EXAMPLE 1

Producing a Primary Battery 1 g PVDF-HFP, 1.5 g dibutyl phthalate, and 10 g acetone are mixed with 7 g zinc powder for the anode, with 5 g $SiO_2$ for the electrolyte, and with 7 g $MnO_2$ for the cathode. The electrodes and electrolytes are pulled into tapes, the acetone is evaporated out, and the plasticizer is extracted with hexane. The tapes are filled with aqueous-alcoholic KOH solution (solvent: 50% water, 50% alcohol) and pressed between two stainless steel electrodes.

EXAMPLE 2

Producing a Secondary Battery 1 g PVDF-HFP, 1.5 g dibutyl phthalate, and 10 g acetone are mixed with 7 g $Cd(OH)_2$ for the anode, with 5 g $SiO_2$ for the electrolyte, and with 7 g $Ni(OH)_2$ for the cathode. The electrodes and electrolytes are pulled into tapes, the acetone is evaporated out, and the plasticizer is extracted with hexane. The tapes are filled with aqueous-alcoholic KOH solution (solvent: 70% water, 30% alcohol) and pressed between two stainless steel electrodes.

The specification incorporates by reference the disclosure of German priority documents 198 48 255.8 of 20 Oct. 1998, 198 08 532.3 of 28 Feb. 1999 and PCT/EP99/07855 of 15 Oct. 1999.

The present invention is, of course, in no way restricted to the specific disclosure of the specification and drawings, but also encompasses any modifications within the scope of the appended claims.

The invention claimed is:

1. A paste-like mass that can be used in electrochemical elements, comprising a heterogeneous mixture of:
    a matrix containing or comprising at least one of the group consisting of organic polymer, precursors thereof, and prepolymers thereof;
    an electrolyte that does not dissolve said matrix or essentially does not dissolve said matrix, wherein the electrolyte can contain up to 70 vol. % organic solvent, relative to the total quantity of solvent used, said solvent being miscible with water; and
    a powdery solid that is essentially inert relative to said electrolyte, and wherein said electrolyte is an anhydrous, inorganic liquid and contains at least one of undissolved solid electrolytes, a mixed conductor, and electrolyte material.

2. A paste-like mass in accordance with claim 1, wherein said matrix also contains at least one of: a plasticizer; and a solvent or a swelling agent.

3. A paste-like mass in accordance with claim 1, wherein said matrix is or contains a cross-linkable liquid or soft resin.

4. A paste-like mass in accordance with claim 1, wherein a hygroscopic salt is furthermore worked into said matrix material.

5. A paste-like mass in accordance with claim 1, wherein said inorganic liquid contains magnesium chloride.

6. A paste-like mass in accordance with claim 1, wherein said matrix is or contains a cross-linkable liquid or soft resin and said resin is selected from among cross-linkable addition polymers and condensation resins, said cross-linkable addition polymers and condensation resins comprising aminoplasts, phenoplasts, epoxy resins, polyesters, polycarbamates, and methyl methacrylate reaction resins.

7. A paste-like mass in accordance with claim 1, wherein said organic polymer of said matrix is selected from among natural polymers and synthetic polymers and mixtures thereof, especially natural and synthetic polysaccharides, proteins, resins, waxes, and halogenated and non-halogenated rubbers, thermoplasts, and thermoelastomers.

8. A paste-like mass in accordance with claim 1, wherein said matrix contains or comprises at least one organic polymer that is at least partially dissolved or swollen in a solvent or swelling agent and said organic polymer is selected from among synthetic polymers and natural polymers and mixtures thereof.

* * * * *